United States Patent Office 3,509,141
Patented Apr. 28, 1970

3,509,141
2-AMINO-QUINAZOLINES
Gordon Northrop Walker, Morristown, N.J., assignor to Ciba Corporation, New York, N.Y., a corporation of Delaware
No Drawing. Filed Sept. 15, 1966, Ser. No. 579,511
Int. Cl. C07d 87/46
U.S. Cl. 260—247.1
7 Claims

ABSTRACT OF THE DISCLOSURE 2-amino-4-aryl-quinazolines of the Formula I

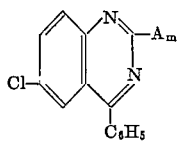

(I)

$Am$=secondary or tertiary amino and salts thereof are useful as antiinflammatory agents, preferably for oral application, in the treatment of tissue inflammations, such as arthritic inflammations and similar conditions.

SUMMARY OF THE INVENTION

The present invention concerns and has for its object the provision of secondary or tertiary 2-amino-4-aryl-quinazolines and methods for their preparation.

DESCRIPTION OF THE PREFERRED EMBODIMENT

More particularly the invention relates to compounds having the Formula I

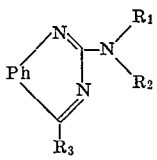

(I)

in which Ph stands for a 1,2-phenylene radical, $R_1$ for hydrogen or an aliphatic hydrocarbon radical, $R_2$, or $R_1$ and $R_2$ when taken together, for an aliphatic hydrocarbon radical and $R_3$ for a carbocyclic or heterocyclic aromatic radical, acyl derivatives.

Formula II

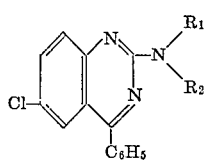

(II)

in which $R_1$ stands for hydrogen, methyl or ethyl and $R_2$ for methyl, ethyl or 2-dimethylamino-ethyl or $R_1$ and $R_2$ together for 1,4-butylene, 1,5-pentylene, 3-methyl-3-aza-1,5-pentylene or 3-oxa-1,5-pentylene, and therapeutically acceptable acid addition salts thereof, which, when given orally to rats at doses between about 5 and 50 mg./kg./day, preferably between about 10 and 25 mg./kg./day, show outstanding antiinflammatory effects according to the granulama pouch or carrageenin paw test.

The compounds of this invention are prepared according to known methods. For example, the process for their preparation consists in (a) reacting a 2-hydroxy or mercapto-4-aryl-quinazoline, more particularly such of the Formula III

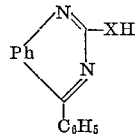

(III)

in which X stands for oxygen or sulfur, or preferably a reactive ester or ether thereof, with a primary or secondary amine, preferably that of the formula $R_1$—NH—$R_2$, or (b) reacting a primary 2-amino-4-aryl-quinazoline, more particularly such of the Formula IV

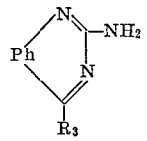

(IV)

with a reactive ester of an alcohol, preferably that of the formula $R_2$—OH, or with an aldehyde or ketone while reducing, or (c) condensing a 2-aroyl-aniline, more particularly such of the Formula V

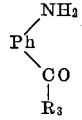

(V)

with an N-substituted cyanamide or guanidine, preferably those of the formulae

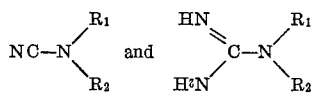

and, if desired, converting any compound obtained into another disclosed compound, wherein Ph represents 4-chloro-1,2-phenylene.

A reactive ester of the 2-hydroxy-4-aryl-quinazoline, more particularly is such a hydrohalic or sulfonic acid, such as hydrochloric, hydrobromic, methane-, ethane-, benzene- or p-toluenesulfonic acid. An ether of the compounds mentioned under item (a) is preferably a lower alkyl ether. The dehydrogenation mentioned under item (d) is preferably carried out with catalysts, e.g. palladium catalysts, or oxidation agents, such as potassium ferricyanide.

The compounds obtained according to said process may be converted into other disclosed compounds by methods in themselves known. Thus, for example, into any secondary or tertiary nitrogen atom, for example into compounds of Formula II in which $R_1$ stands for hydrogen, a substituent may be introduced, if necessary, after conversion of the compound obtained into a metal, e.g. alkali metal, derivatives thereof. This can be done, for example, by reaction with a reactive ester of an appropriate alcohol, for example, that of a hydrohalic or sulfonic acid, e.g. those mentioned above, an aryl diazonium salt or an acid halide, whereby acyl derivatives, tertiary amines or quaternaries are obtained, or by reductive alkylation analogous to reaction (b), i.e. reaction with an appropriate oxo-compound and subsequent reduction.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Condensing agents are especially used in the reaction with said reactive esters in order to eliminate the acid formed. They are basic agents, for example, alkali or alkaline earth metal carbonates or lower alkoxides, or more especially, organic bases such as pyridine or collidine, but particularly aliphatic tertiary amines, such as a tri-lower alkylamine, e.g. triethylamine.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic, or heterocyclic carboxylic or sulfonic acids, for example, formic, acetic, propionic, succinic, glycollic, lactic, malic, tartaric, citric, ascorbic, maleic, hydroxymaleic, pyroracemic phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly, those starting materials should be used in the reaction of the invention that lead to the formation of those compounds indicated above as being specially valuable.

The starting material used in reaction (a) is prepared by condensation of 2-aroyl-anilines with urea or thiourea and, if desired, esterification or etherification of the resulting 2-hydroxy- or mercapto-4-aryl-quinazoline in the customary manner, for example wiht the use of phosphorus halogenides or sulfonic acid halides, or reactive esters of alcohols, such as alkyl halogenides or sulfates. The starting material mentioned under items (b) and (c) is known or, if new, may be prepared analogous to the method given for the known members.

The compounds of this invention are useful in the form of compositions for enteral, parenteral or topical administration which contain a pharmacological effective amount of the compounds of this invention in admixture with a pharmaceutically acceptable, organic or inorganic, solid or liquid carrier, which usually represents the major portion of the pharmaceutical composition. For making up the latter, there are employed carrier materials suitable for the preparation of pharmaceutical compositions, such as water, gelatin, sugars, e.g. lactose, glucose or sucrose, starches, e.g. corn starch, wheat starch or rice starch, stearic acid or salts thereof, e.g. calcium or magnesium stearate, talc, vegetable oils, alcohol, e.g. ethanol, benzyl alcohol or cetyl alcohol, petrolatum, gums, accacia, propylene glycol, polyalkylene glycols or any other known carrier for pharmaceutical compositions. The pharmaceutical preparations may be in solid form, e.g. capsules, tablets or dragees, in liquid form, e.g. solutions or suspensions, or in the form of emulsions, e.g. salves or creams. If desired, they may contain auxiliary substances, such as preserving, stabilizing, wetting, emulsifying or coloring agents, salts for varying the osmotic pressure or buffers. The above preparations are prepared according to standard methods used for the manufacture of pharmaceutically acceptable compositions which, if desired, also contain, in combination, other physiologically useful substances.

The following examples are intended to illustrate the invention and are not to be construed as being limitations thereon. Temperatures are given in degrees centigrade and all parts wherever given are parts by weight.

EXAMPLE 1

5.0 g. 2,6-dichloro-4-phenyl-quinazoline are dissolved in 100 ml. saturated methanolic methylamine and the solution is allowed to stand for 2½ days. It is then evaporated on the steam cone and the residue recrystallized from methanol-diethyl ether to yield the 2-methylamino-4-phenyl-6-chloro-quinazoline of the formula

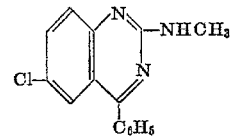

melting at 183–185°.

The starting material is prepared as follows: The mixture of 2-hydroxy-4-phenyl-6-chloro-quinazoline and 60 ml. phosphorus oxychloride is refluxed for 3 hours. Hereupon it is evaporated in vauco and the residue triturated with diethyl ether. It is dissolved in diethyl ether, the solution washed with aqueous sodium carbonate, dried, filtered and evaporated. The residue is recrystallized from diethyl ether to yield the 2,6-dichloro-4-phenyl-quinazoline melting at 160–161°.

In the analogous manner the 2-isopropylamino-4-phenyl-6-chloro-quinazoline is obtained.

EXAMPLE 2

4.5 g. 2,6-dichloro-4-phenyl-quinazoline are treated with 90 ml. anhydrous dimethylamine and the resulting solution is kept for 2 hours in the ice bath and then allowed to evaporate during 2½ days. The residue is dissolved in diethyl ether, the solution washed with water, dried, filtered and evaporated. The residue is recrystallized from diethyl ether to yield the 2-dimethylamino-4-phenyl-6-chloro-quinazoline of the formula

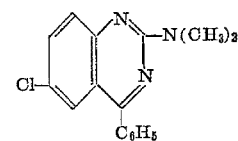

melting at 140–141°.

1.0 g. thereof are dissolved in diethyl ether and the solution acidified with concentrated hydrochloric acid. The precipitate formed is filtered off and washed with aqueous ethanol to yield the corresponding hydrochloride melting at 258–260° with decomposition.

EXAMPLE 3

The mixture of 10.0 g. 2,6-dichloro-4-phenyl-quinazoline and 110 ml. of anhydrous diethylamine is allowed to stand at room temperature for 2½ days and finally refluxed for ½ hour. It is then evaporated, the residue taken up in diethyl ether, the solution washed with water, dried, filtered and evaporated. The residue is recrystallized from diethyl ether-petrol ether to yield the 2-diethylamino-4-phenyl-6-chloro-quinazoline of the formula

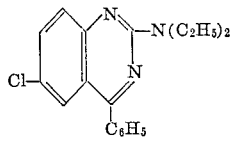

melting at 89–90°. The corresponding hydrochloride melts at 220–222° after recrystallization from ethanol.

EXAMPLE 4

The mixture of 5.5 g. 2,6-dichloro-4-phenyl-quinazoline, 6.0 g. 2-dimethylamino-ethylamine and 30 ml. methanol is allowed to stand overnight at room temperature. Hereupon it is evaporated on the steam cone, the residue dissolved in diethyl ether, the solution washed with water, dried, filtered and evaporated. The residue is recrystallized from diethyl ether to yield the 2-(2-dimethylamino-ethylamino)-4-phenyl-6-chloro-quinazoline of the formula

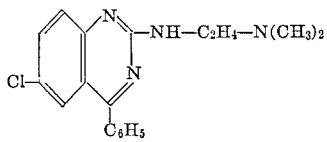

melting at 103–104°.

EXAMPLE 5

The mixture of 5.0 g. 2,6-dichloro-4-phenyl-quinazoline and 25 ml. morpholine is heated at the steam cone for ½ an hour. Hereupon it is evaporated, the residue triturated with water and recrystallized from ethanol to yield the 2-morpholino-4-phenyl-6-chloro-quinazoline of the formula

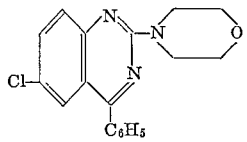

melting at 168–169°.

EXAMPLE 6

The mixture of 10.0 g. 2,6-dichloro-4-phenyl-quinazoline and 15.0 g. 1-methyl-piperazine is allowed to stand overnight at room temperature. The solid obtained is triturated with water, dissolved in diethyl ether, the solution washed with water, dried, filtered and evaporated. The residue is recrystallized from di-ethyl ether to yield the 2-(4-methyl-piperazino)-4-phenyl-6-chloro - quinazoline of the formula

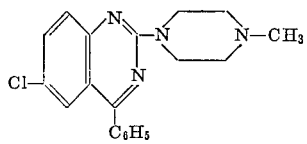

melting at 136–138°.

EXAMPLE 7

The mixture of 10.0 g. 2-dimethylamino-4-phenyl-6-chloro-3,4-dihydro-quinazoline, 5.0 g. 10% palladium-carbon and 1 liter p-cymene is boiled for 10 minutes to remove water and then refluxed for 2 hours. It is filtered hot, the filtrate evaporated in vacuo and the residue recrystrallized from diethyl ether to yield the 2-dimethylamino-4-phenyl-6-chloro-quinazoline melting at 140–141°; it is identical with the product obtained according to Example 2.

What is claimed is:

1. A compound having the formula

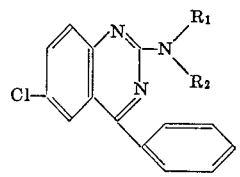

in which $R_1$ is a member selected from the group consisting of hydrogen, methyl and ethyl and $R_2$ is a member selected from the group consisting of methyl, ethyl and 2-dimethylaminoethyl, or $R_1$ and $R_2$ taken together with the nitrogen atom is a member selected from the group consisting of pyrrolidino, piperidino, 4-methylpiperazino or morpholino or a therapeutically acceptable acid addition salt thereof.

2. A compound as claimed in claim 1 and being a member selected from the group consisting of 2-methylamino-4-phenyl-6-chloro-quinazoline and a therapeutically acceptable acid addition salt thereof.

3. A compound as claimed in claim 1 and being a member selected from the group consisting of 2-dimethylamino-4-phenyl-6-chloro-quinazoline and a therapeutically acceptable acid addition salt thereof.

4. A compound as claimed in claim 1 and being a member selected from the group consisting of 2-diethylamino-4-phenyl-6-chloro-quinazoline and a therapeutically acceptable acid addition salt thereof.

5. A compound as claimed in claim 1 and being a member selected from the group consisting of 2-(2-dimethylamino-ethylamino) - 4 - phenyl - 6 - chloro-quinazoline and a therapeutically acceptable acid addition salt thereof.

6. A compound as claimed in claim 1 and being a member selected from the group consisting of 2-morpholino-4-phenyl-6-chloro-quinazoline and a therapeutically acceptable acid addition salt thereof.

7. A compound as claimed in claim 1 and being a member selected from the group consisting of 2-(4-methyl-piperazino)-4-phenyl-6-chloro-quinazoline and a therapeutically acceptable acid addition salt thereof.

No reference cited.

ALEX MAZEL, Primary Examiner

J. TOVAR, Assistant Examiner

U.S. Cl. X.R.

260—256.4, 256.5; 424—248, 251